US012573700B2

(12) United States Patent
Lee et al.

(10) Patent No.: US 12,573,700 B2
(45) Date of Patent: Mar. 10, 2026

(54) BATTERY PACK

(71) Applicants: Hyundai Motor Company, Seoul (KR); Kia Corporation, Seoul (KR)

(72) Inventors: Kang Won Lee, Seongnam-si (KR); Jeong Hun Seo, Suwon-si (KR); In Gook Son, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 739 days.

(21) Appl. No.: 17/871,495

(22) Filed: Jul. 22, 2022

(65) Prior Publication Data

US 2023/0080788 A1        Mar. 16, 2023

(30) Foreign Application Priority Data

Sep. 15, 2021    (KR) ......................... 10-2021-0123512

(51) Int. Cl.
| | |
|---|---|
| *H01M 50/242* | (2021.01) |
| *B60L 3/00* | (2019.01) |
| *B60L 50/64* | (2019.01) |
| *H01M 10/44* | (2006.01) |
| *H01M 10/48* | (2006.01) |

(Continued)

(52) U.S. Cl.
CPC ......... *H01M 50/242* (2021.01); *B60L 3/0046* (2013.01); *B60L 50/64* (2019.02); *H01M 10/441* (2013.01); *H01M 10/482* (2013.01); *H01M 50/211* (2021.01); *H01M 50/249* (2021.01); *H01M 50/264* (2021.01); *H01M 50/271* (2021.01); *H01M 50/291* (2021.01); *H01M 50/512* (2021.01); *H02J 7/0029* (2013.01); *H01M 2220/20* (2013.01)

(58) Field of Classification Search
CPC ............. H01M 50/242; H01M 50/249; H01M 50/264; H01M 50/211; H01M 50/291; H01M 50/512; H01M 50/271; H01M 10/441; H01M 10/482; H01M 2220/20; B60L 50/64; B60L 3/0046; H02J 7/0029
See application file for complete search history.

(56) References Cited

U.S. PATENT DOCUMENTS

| | | | |
|---|---|---|---|
| 9,214,658 B2 | 12/2015 | Lee et al. | |
| 2012/0097466 A1* | 4/2012 | Usami ...................... | B60K 1/04 |
| | | | 180/68.5 |

(Continued)

FOREIGN PATENT DOCUMENTS

| | | |
|---|---|---|
| JP | 2014501019 A | 1/2014 |
| KR | 101222369 B1 | 1/2013 |

(Continued)

OTHER PUBLICATIONS

KR 20160007696 MT (Year: 2016).*

*Primary Examiner* — Alexander Usyatinsky
(74) *Attorney, Agent, or Firm* — Slater Matsil, LLP

(57) ABSTRACT

An embodiment battery pack includes battery modules each including a plurality of battery cells stacked and connected in parallel, the battery modules being arranged adjacent to each other, a housing fixedly surrounding the battery modules, and an auxiliary rigid plate disposed between the battery modules so as to face side surfaces of the battery modules, the auxiliary rigid plate being coupled to the housing and defining a unitary rigid body together with the housing.

20 Claims, 9 Drawing Sheets

10(140,142,162)

(51) Int. Cl.
  *H01M 50/211* (2021.01)
  *H01M 50/249* (2021.01)
  *H01M 50/264* (2021.01)
  *H01M 50/271* (2021.01)
  *H01M 50/291* (2021.01)
  *H01M 50/512* (2021.01)
  *H02J 7/00* (2006.01)

(56) References Cited

U.S. PATENT DOCUMENTS

| | | | |
|---|---|---|---|
| 2012/0171553 A1 | 7/2012 | Guen et al. | |
| 2013/0020139 A1* | 1/2013 | Kim | B60K 1/04 |
| | | | 903/952 |
| 2013/0224548 A1 | 8/2013 | Choi et al. | |
| 2014/0017546 A1* | 1/2014 | Yanagi | H01M 10/613 |
| | | | 429/120 |
| 2018/0076487 A1 | 3/2018 | Lee et al. | |
| 2018/0138565 A1 | 5/2018 | Lee et al. | |
| 2018/0205055 A1* | 7/2018 | Hilligoss | H01M 10/443 |
| 2019/0326569 A1 | 10/2019 | Chi et al. | |
| 2020/0067040 A1 | 2/2020 | Kim et al. | |
| 2021/0028514 A1 | 1/2021 | Park | |
| 2021/0305546 A1* | 9/2021 | Chang | H01M 50/204 |

FOREIGN PATENT DOCUMENTS

| | | | |
|---|---|---|---|
| KR | 20160007696 | * | 1/2016 |
| KR | 20160007696 A | | 1/2016 |
| KR | 20170053429 A | | 5/2017 |
| KR | 20180113906 A | | 10/2018 |
| KR | 20180137308 A | | 12/2018 |
| KR | 20190086171 A | | 7/2019 |
| KR | 20200021609 A | | 3/2020 |
| KR | 20210012544 A | | 2/2021 |

* cited by examiner

CELL ASSY. : WEIGHT A X 2

CELL ASSY. : WEIGHT A X 2

240

260

220

240

BATTERY PACK

CROSS-REFERENCE TO RELATED APPLICATIONS

This application claims the benefit of Korean Patent Application No. 10-2021-0123512, filed on Sep. 15, 2021, which application is hereby incorporated herein by reference.

TECHNICAL FIELD

The present invention relates to a battery pack.

BACKGROUND

The configurations of batteries vary depending on the types of apparatuses employing the same. In particular, unlike small mobile devices such as mobile phones, electric vehicles, which consume a large amount of power and are driven for a long time, need to employ large capacity batteries having a structure capable of realizing increased output and capacity.

Therefore, in this case, a battery may be structured such that multiple cells are connected in a cell-module-pack configuration in order to store energy in a single pack in an integrated manner. In order to increase the price competitiveness of the battery, there has been developed large-area battery pack technology having a cell-to-pack (CTP) structure, in which the number of modules that are necessary is reduced by minimizing module structures, or from which modules are eliminated.

However, in such a CTP structure, since a large-area module is heavier than a conventional module, the battery having a CTP structure is vulnerable to external force such as vibrations or impacts, the magnitude of which is proportional to the weight of the module. Therefore, the battery having a CTP structure needs to be designed so as to better withstand vibrations or impacts than the conventional module.

The information disclosed in this Background section is only for enhancement of understanding of the general background of the invention, and should not be taken as an acknowledgement or any form of suggestion that this information forms the related art already known to a person skilled in the art.

SUMMARY

The present invention relates to a battery pack. Particular embodiments relate to a battery pack capable of solving a problem associated with a battery pack in which a battery module including a plurality of battery cells is cased only with an end plate coupled thereto by employing a rigid plate to disperse weight, thereby improving the structural stability of the battery module and effectively storing high energy in the battery module.

Therefore, embodiments of the present invention have been made in view of problems in the art, and an embodiment of the present invention provides a battery pack capable of solving a problem associated with a battery pack in which a battery module including a plurality of battery cells is cased only with an end plate coupled thereto by employing a rigid plate to disperse weight, thereby improving the structural stability of the battery module and effectively storing high energy in the battery module.

However, embodiments of the invention are not limited to the above-mentioned embodiments, and other embodiments not mentioned herein will be clearly understood by those skilled in the art from the following description.

In accordance with an embodiment of the present invention, there is provided a battery pack including battery modules including a plurality of battery cells stacked and connected in parallel, the battery modules being arranged adjacent to each other, a housing fixedly surrounding the battery modules, and an auxiliary rigid plate disposed between the battery modules so as to face side surfaces of the battery modules, the auxiliary rigid plate being coupled to the housing so as to form a unitary rigid body together with the housing.

The auxiliary rigid plate may include a first mounting structure configured to be coupled to the housing and to protrude in a direction perpendicular to the direction in which the plurality of battery cells is stacked so as to be mounted in a space between the battery modules.

The first mounting structure may include a first nut portion so as to be bolted to the auxiliary rigid plate.

The housing may include a top cover including a top clamp configured to fixedly cover upper surfaces of the battery modules in order to hold the battery modules, and a bottom clamp configured to fixedly cover lower surfaces of the battery modules in order to hold the battery modules.

The housing may further include an end plate disposed on a side surface of each of the battery modules perpendicular to the direction in which the battery modules are connected to each other, and the end plate may include a second nut portion so as to be bolted to the auxiliary rigid plate.

The end plate may further include a second mounting structure protruding from a side surface thereof in a direction parallel to the direction in which the plurality of battery cells is stacked.

The auxiliary rigid plate may include a third nut portion so as to be bolted to the top clamp and a fourth nut portion so as to be bolted to the bottom clamp.

The end plate may be provided in a plurality thereof, and the plurality of end plates may include a right end plate disposed on a right surface of a right one of the battery modules, and a left end plate disposed on a left surface of a left one of the battery modules, the left end plate being engaged with the right end plate to form a unitary rigid body.

The battery pack may further include a tray, which is spaced apart from the housing while covering the housing and which provides a space in which to seat the battery modules. The battery modules may be mounted on the tray by a first mounting member configured to connect the tray to the auxiliary rigid plate and to protrude so as to be mounted in the space between the battery modules.

The battery pack may further include a sensor mounted on an inner surface of the tray, the sensor being configured to sense contact, and a protection circuit configured to control charging and discharging of the plurality of battery cells based on the result of sensing of contact.

The battery pack may further include a pad disposed between adjacent ones of the plurality of battery cells.

In accordance with another embodiment of the present invention, there is provided a battery pack including battery modules including a plurality of battery cells stacked and connected in parallel and a first housing fixedly surrounding the plurality of battery cells, the battery modules being arranged adjacent to each other, a second housing fixedly surrounding the battery modules, and an auxiliary rigid plate disposed between the battery modules so as to face side surfaces of the battery modules, the auxiliary rigid plate being coupled to the housing so as to form a unitary rigid body together with the housing.

The auxiliary rigid plate may include a first mounting structure configured to be coupled to the second housing and to protrude in a direction perpendicular to the direction in which the plurality of battery cells is stacked so as to be mounted in a space between the battery modules.

The first mounting structure may include a first nut portion so as to be bolted to the auxiliary rigid plate.

In accordance with a further embodiment of the present invention, there is provided a vehicle including the battery pack described above.

BRIEF DESCRIPTION OF THE DRAWINGS

The above and other objects, features and other advantages of embodiments of the present invention will be more clearly understood from the following detailed description taken in conjunction with the accompanying drawings, in which:

FIG. 3B is a cross-sectional view of a battery pack according to an embodiment of the present invention;

DETAILED DESCRIPTION OF ILLUSTRATIVE EMBODIMENTS

Figure 1:
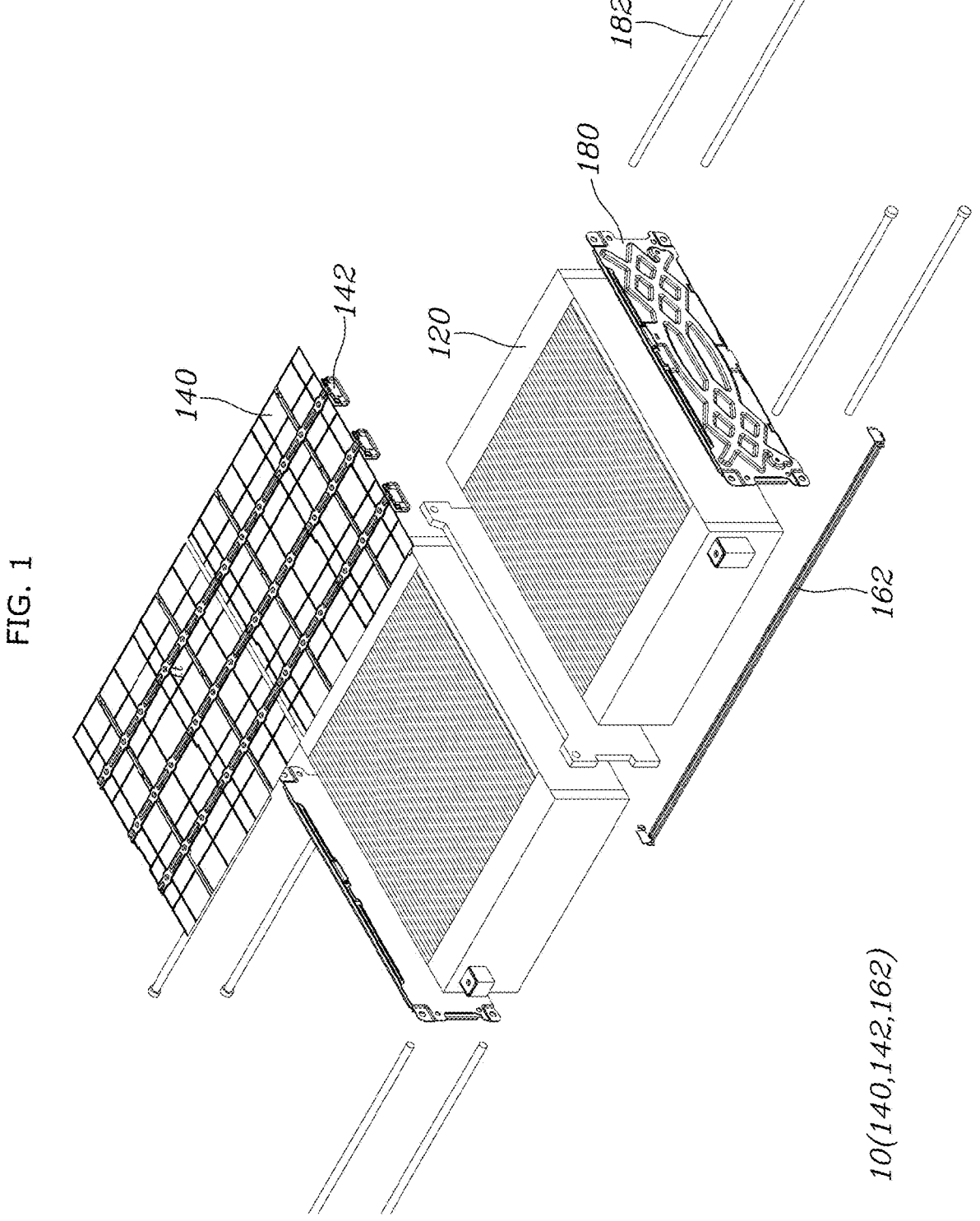
FIG. 1 is a view showing a battery pack according to an embodiment of the present invention.

Various exemplary embodiments will now be described more fully with reference to the accompanying drawings, in which only some exemplary embodiments are shown. Specific structural and functional details disclosed herein are merely representative for the purpose of describing exemplary embodiments. The present invention, however, may be embodied in many alternative forms, and should not be construed as being limited to the exemplary embodiments set forth herein.

In the drawings, illustration of parts unrelated to the description is omitted to clearly and briefly describe the present invention, and the same or extremely similar components are denoted by the same reference numerals throughout the specification. The number, sizes, and thicknesses of components shown in the drawings are arbitrarily shown for understanding and ease of description, but the present invention is not limited thereto. In the drawings, the thicknesses of components may be exaggeratedly illustrated for the sake of convenience and clarity. In the following description, terms such as "first", "second", etc. may be used to describe the components of the embodiments. These terms are only used to distinguish one element from another element, and the essence, order, or sequence of corresponding elements is not limited by these terms. Additionally, the term "comprises", "includes", or "has" described herein should be interpreted not to exclude other elements but to further include such other elements unless mentioned otherwise.

Hereinafter, exemplary embodiments of the present invention will be described in detail with reference to the accompanying drawings.

Figure 2A:
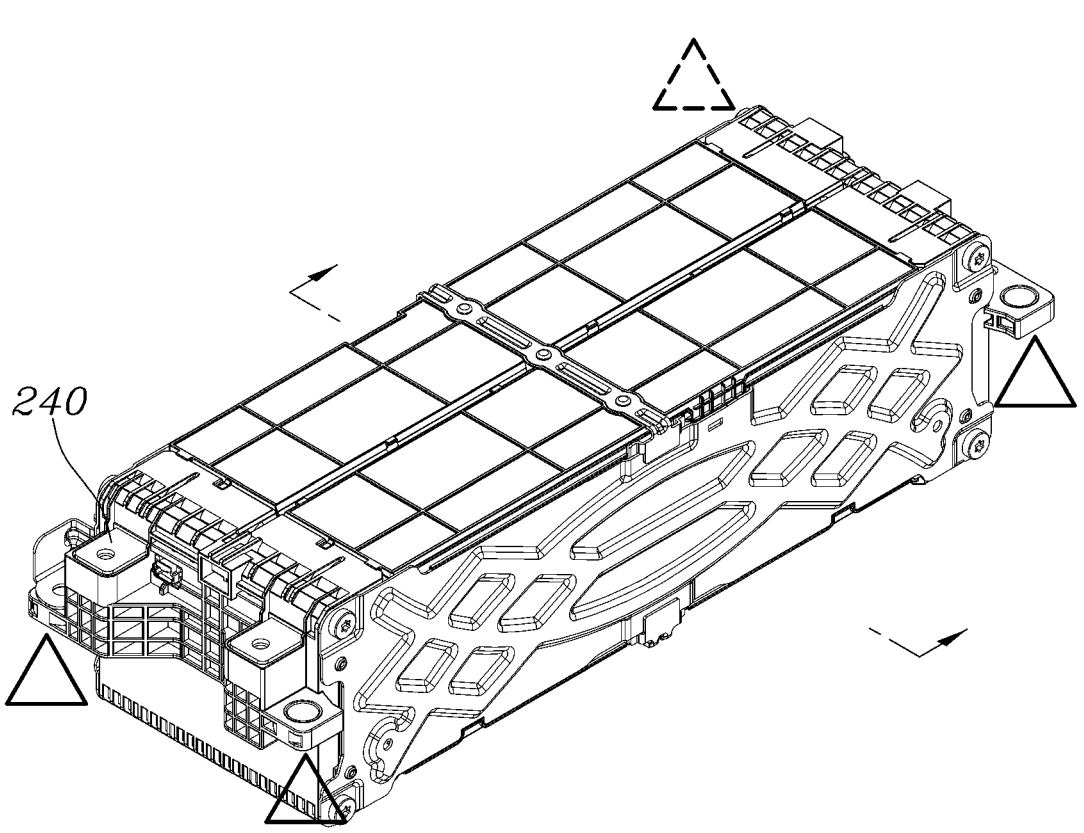
FIG. 2A is a view showing a conventional battery pack.
Figure 2B:
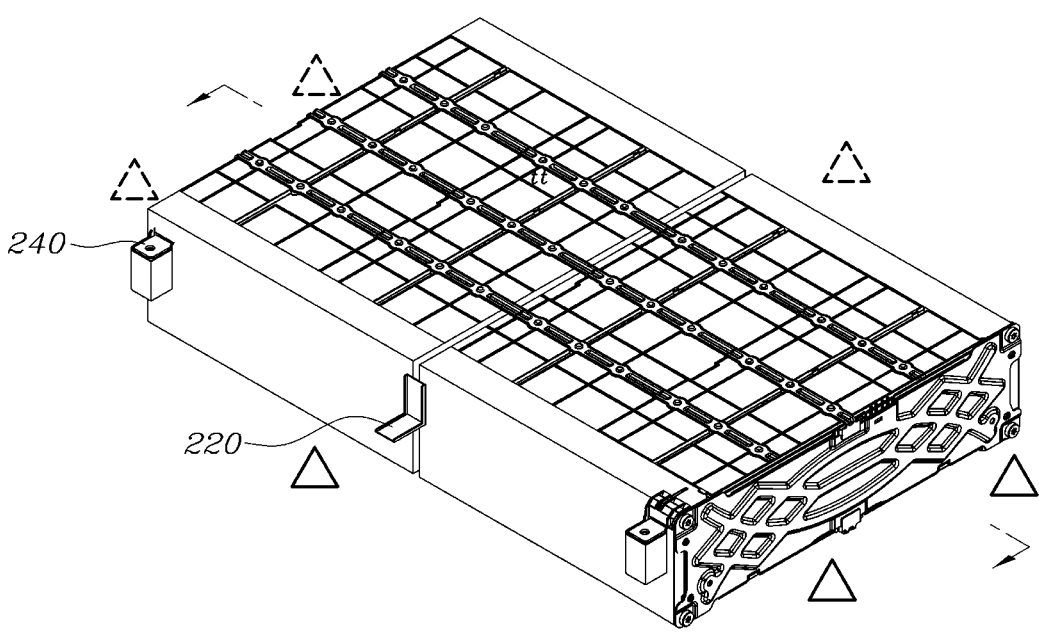
FIGS. 2B and 2C are views showing a battery pack according to an embodiment of the present invention.
Figure 3A:
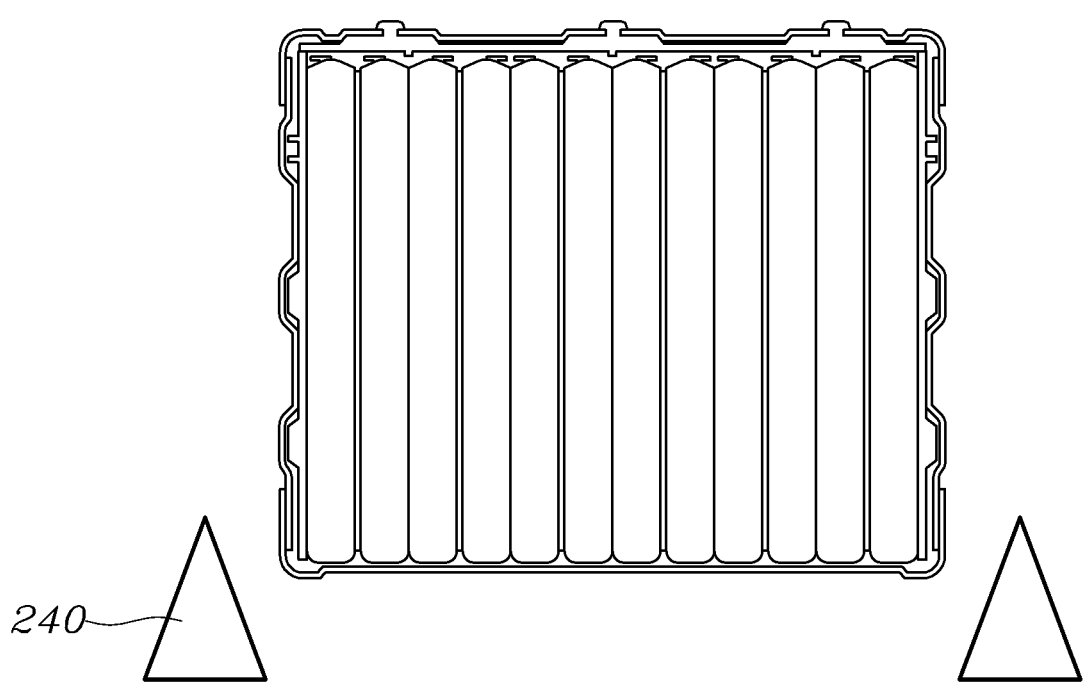
FIG. 3A is a cross-sectional view of the conventional battery pack.
Figure 3B:
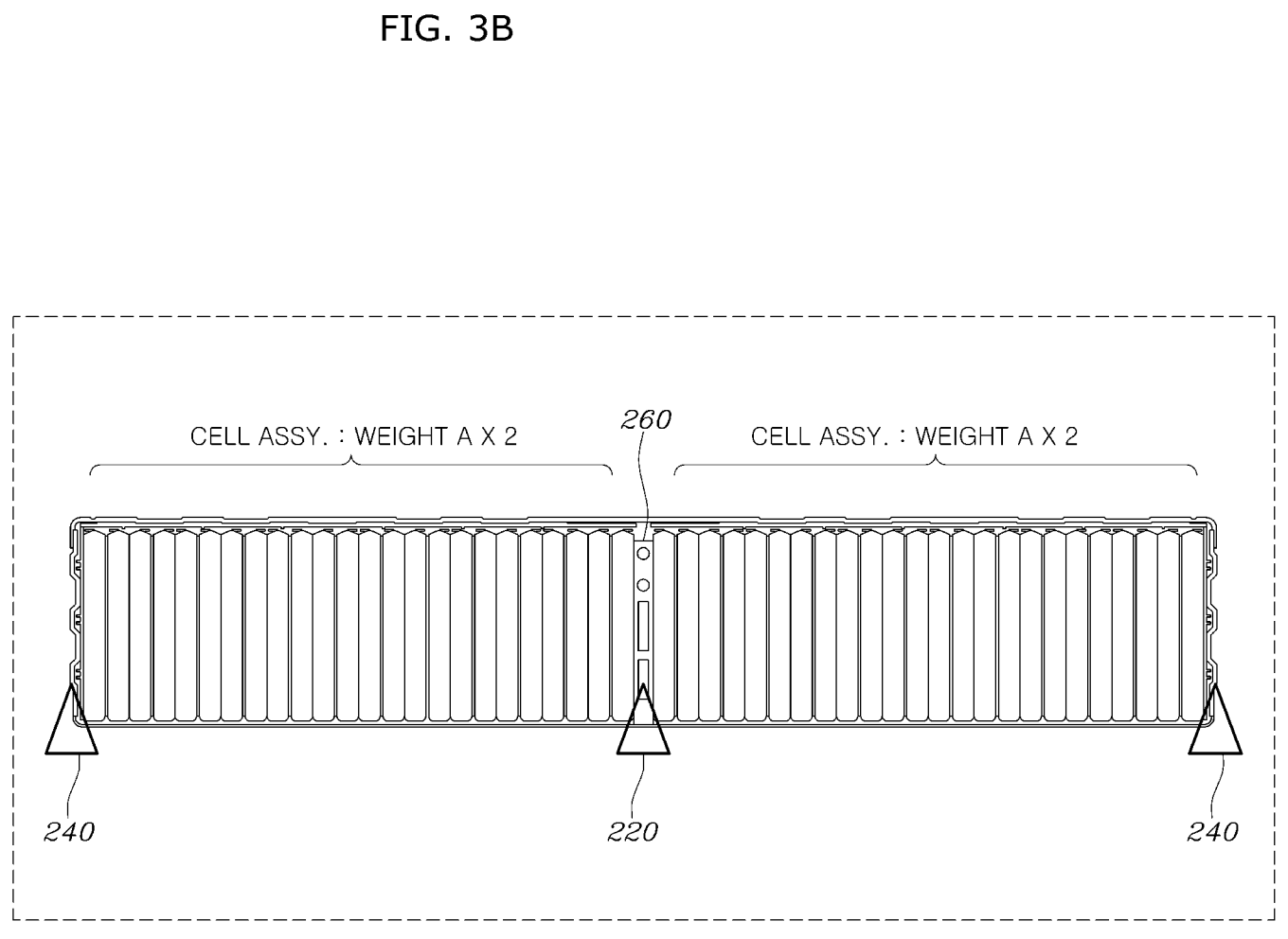
Figure 4:
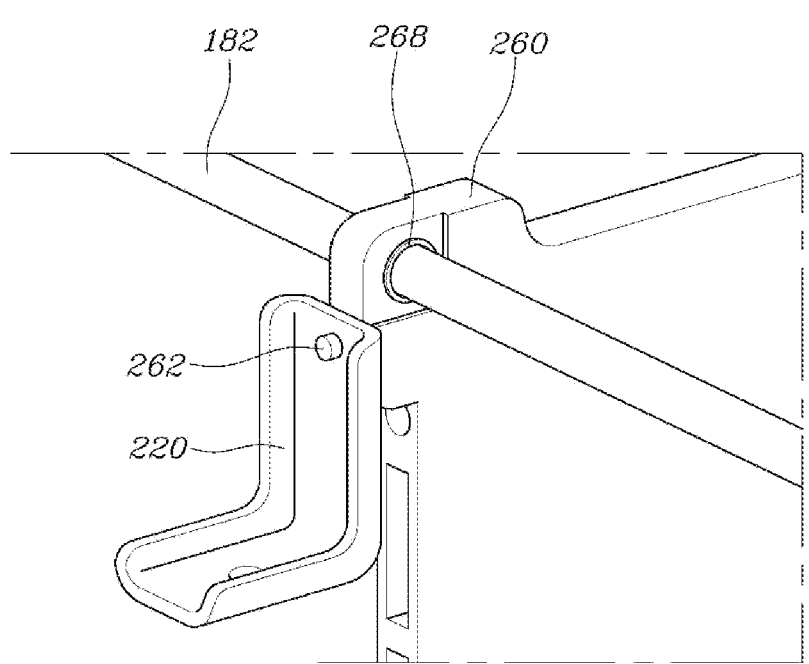
FIG. 4 is a view showing the structure in which a separate fastening member is connected to an auxiliary rigid plate of the battery pack according to an embodiment of the present invention.
Figure 5A:
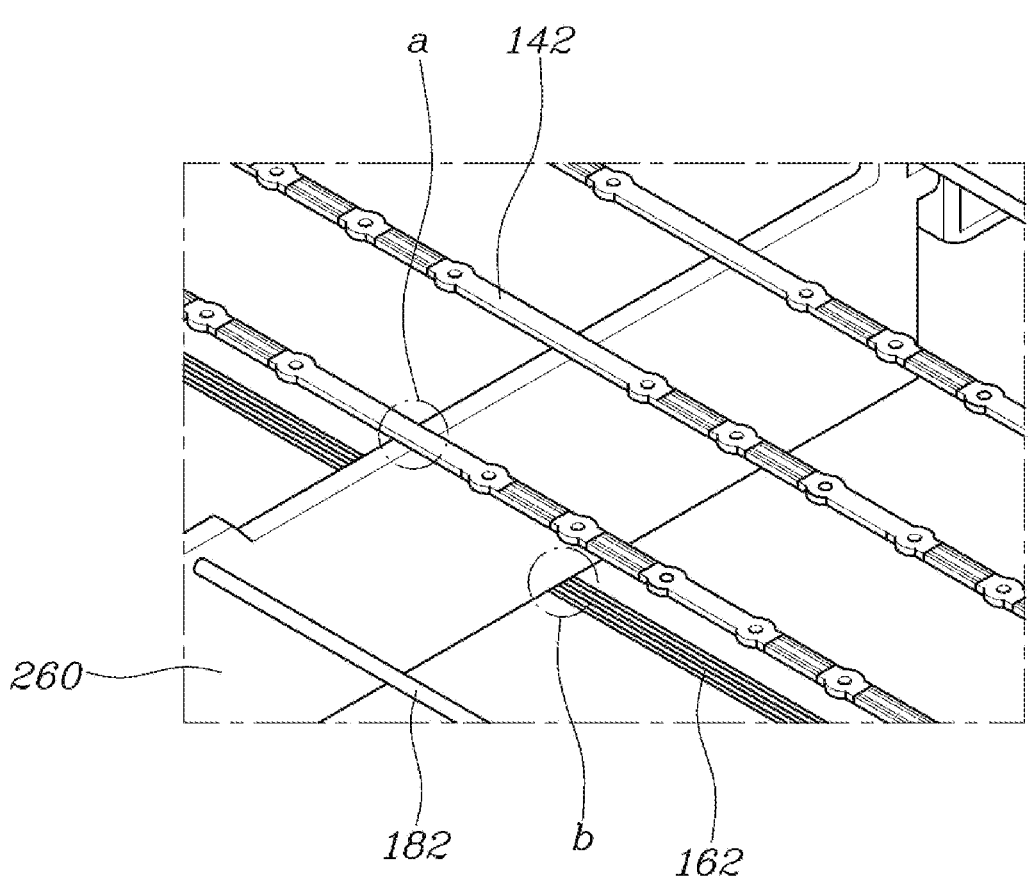
FIGS. 5A to 5C are views showing a structure in which an auxiliary rigid plate and top and bottom clamps are coupled to each other in a battery pack according to an embodiment of the present invention.
Figure 5B:
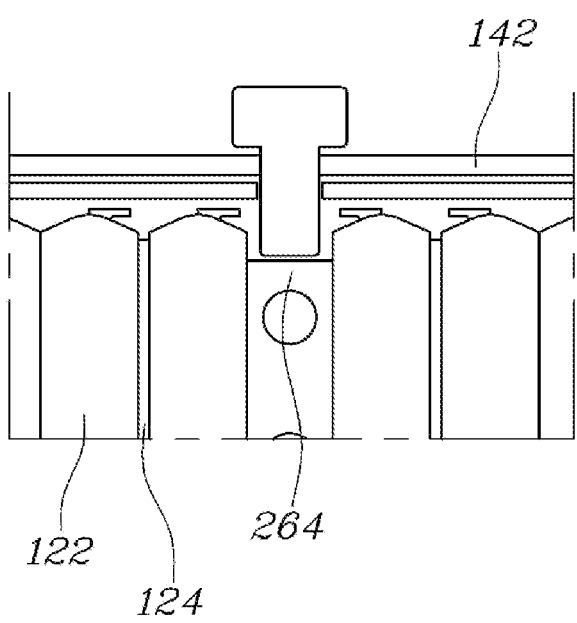
Figure 5C:
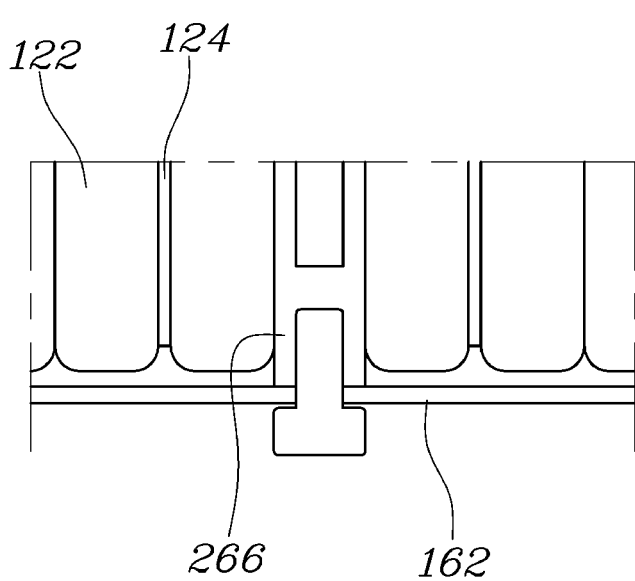

FIG. 1 is a view showing a battery pack according to an embodiment of the present invention, FIG. 2A is a view showing a conventional battery pack, FIG. 2B is a view showing a battery pack according to an embodiment of the present invention, FIG. 3A is a cross-sectional view of a conventional battery pack, FIG. 3B is a cross-sectional view of a battery pack according to an embodiment of the present invention, FIG. 4 is a view showing a structure in which a separate fastening member is connected to an auxiliary rigid plate of a battery pack according to an embodiment of the present invention, and FIGS. 5A-5C are views showing a structure in which an auxiliary rigid plate and top and bottom clamps are coupled to each other in a battery pack according to an embodiment of the present invention.

FIG. 1 is a view showing a battery pack according to an embodiment of the present invention. A battery pack according to an embodiment of the present invention may include battery modules 120, which include a plurality of battery cells stacked and connected in parallel and which are arranged adjacent to each other, a housing 10 fixedly surrounding the battery modules 120, and an auxiliary rigid plate 260 disposed between the battery modules 120 so as to face side surfaces of the battery modules 120 and coupled to the housing 10 so as to form a unitary rigid body together with the housing 10. That is, the auxiliary rigid plate is coupled to the battery modules while being disposed therebetween, and is also coupled to the housing 10 to thereby form a unitary rigid body.

As shown in FIG. 1, an embodiment of the present invention is technology related to a battery pack. The battery is a cell-to-pack (CTP)-based battery, in which a plurality of cells is mounted in a single module and a plurality of modules is mounted in a single pack. CTP technology refers to technology for directly integrating cells into a single pack without a module or for minimizing the number of modules. Accordingly, it is possible to integrate energy in a single pack and to greatly reduce the number of bolting processes, thereby ensuring price competitiveness.

However, if the CTP technology is simply applied to a conventional battery module, the conventional battery module may be vulnerable to vibrations or impacts. The conventional module, in which twelve cells are integrated, has a structure in which two opposite side surfaces thereof are cased with end plates. In this case, the conventional module is mounted using two opposite edges of each of the two end plates, i.e., four edges. Also, in the case in which two conventional modules are combined into one integrated module in order to reduce the number of modules, the integrated module is mounted using four edges of the end plates. In this case, even though the weight of the battery pack is doubled, vibrations or impacts are still concentrated on the mounting portions, and thus the battery pack may be affected by a larger amount of vibrations or impacts than the conventional module.

Therefore, the battery pack according to an embodiment of the present invention includes the auxiliary rigid plate 260 disposed between the battery modules, which are arranged adjacent to each other, so as to face side surfaces of the battery modules and coupled to the housing 10 so as to form a unitary rigid body together with the housing 10. The auxiliary rigid plate 260 functions to disperse vibrations and impacts generated when a large-area battery pack is cased only with an end plate. To this end, the auxiliary rigid plate 260 is disposed between the battery modules and is coupled to the housing 10 so that two opposite edges thereof are used as mounting portions, thereby increasing the number of mounting portions by two or more. Accordingly, the battery pack according to an embodiment of the present invention, in which a plurality of modules is integrated, is capable of dispersing the weight thereof and stabilizing the structures of the modules.

FIG. 1 is a view showing the battery pack according to an embodiment of the present invention. In the battery pack according to this embodiment of the present invention, the housing 10 may include a top cover 140, which has a top clamp 142, which fixedly covers the upper surfaces of the battery modules 120 in order to hold the battery modules 120, and a bottom clamp 162, which fixedly covers the lower surfaces of the battery modules 120 in order to hold the battery modules 120.

Although it is illustrated in FIG. 1 that the clamping structure is used as a coupling structure, the embodiments are not limited thereto. The battery modules may be coupled using a single pack case configured to cover all of the battery modules, rather than using separate top and bottom holding members. Alternatively, a top cover and/or a bottom cover may be provided with a fitting protrusion, and a separate housing surrounding the top cover and/or the bottom cover may be provided with a fitting recess for receiving the fitting protrusion fitted thereinto. Alternatively, a top cover and a bottom cover may be mounted to each battery module. In this case, the top cover and the bottom cover may be connected to the auxiliary rigid plate by means of a hinge. The hinge may include a folding area and a non-folding area, which includes a fixing member disposed under the folding area.

FIG. 1 is a view showing the battery pack according to an embodiment of the present invention, and the housing may further include an end plate 180, which is disposed on the side surface of one of the battery modules 120 perpendicular to the direction in which the battery modules 120 are connected to each other. The end plate 180 may have a second nut portion (not shown) for engagement with the auxiliary rigid plate 260 using a bolt 182. In other words, one of the battery modules may be cased with the end plate. Further, the battery modules may also be cased with the auxiliary rigid plate 260, which is interposed therebetween and is bolted to the end plate 180. In this way, since the end plate and the auxiliary rigid plate are integrated with each other, the effect of dispersing the weight through the mounting portions of the auxiliary rigid plate may be improved.

Alternatively, unlike what is illustrated in FIG. 1, in a battery pack according to another embodiment of the present invention, the end plate may be provided in a plural number. The plurality of end plates may include a right end plate disposed on the right surface of a right one of the battery modules and a left end plate disposed on the left surface of a left one of the battery modules. The right end plate and the left end plate may be engaged with each other to form a unitary rigid body. That is, since the end plates, which cover the side surfaces of the battery modules, are engaged with each other and are integrated with the auxiliary rigid plate by means of bolts, the effect of dispersing the weight through the mounting portions of the auxiliary rigid plate may be improved.

Alternatively, unlike what is illustrated in FIG. 1, a battery pack according to another embodiment of the present invention may further include a tray, which is spaced apart from the housing while covering the housing and provides a space in which to seat the battery modules. The battery modules may be mounted on the tray by a first mounting member, which connects the tray to the auxiliary rigid plate and protrudes so as to be mounted in the space between the battery modules. In other words, the battery pack according to this embodiment of the present invention may further include a kind of battery pack case such as the above-described tray, which covers the battery modules, and the battery modules may be seated on the tray by the first mounting member, which is mounted on the tray. Accordingly, when vibrations or impacts are applied to the battery pack, the tray serves to support the battery modules seated thereon so as to prevent electrical disconnection between the battery modules.

Alternatively, unlike what is illustrated in FIG. 1, a battery pack according to another embodiment of the present invention may further include a sensor mounted on the inner surface of the tray in order to sense contact, and a protection circuit configured to control charging and discharging of the battery cells based on the result of sensing of contact. That is, whether the battery pack expands or contracts according to a change in the temperature of the cells or whether strong impacts or vibrations are applied to the battery pack is sensed, whereby it is possible to control whether to stop or resume charging/discharging of the cells.

Here, a switching element included in the protection circuit, which switches in response to a charging or discharging control signal, may be at least one of a bipolar junction transistor (BJT), a silicon-controlled rectifier (SCR), a triode for alternating current (TRIAC), a unijunction transistor (UJT), a programmable unijunction transistor (PUT), a junction field effect transistor (JFET), a gate turn-off thyristor (GTO), a MOS-controlled thyristor (MCT), an injection-enhanced gate transistor (IEGT), an integrated gate bipolar transistor (IGBT), an integrated gate commutated thyristor (IGCT), a metal-oxide-semiconductor field effect transistor (MOSFET), an intelligent power device (IPD), or a diode device.

Figure 2C:
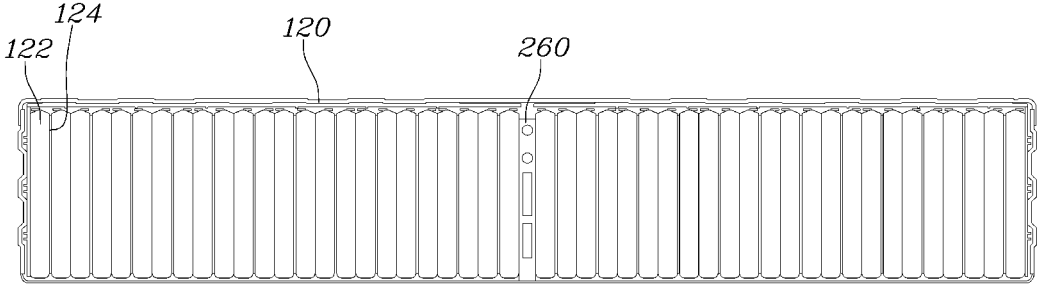

FIG. 2A is a view showing a conventional battery pack, and FIGS. 2B and 2C are views showing a battery pack according to an embodiment of the present invention. In the battery pack according to an embodiment of the present invention, the end plate 180 may further include a second mounting structure 240, which protrudes from the side surface thereof in a direction parallel to the direction in which the cells are stacked. The second mounting structure 240 formed at the end plate functions as a structure that is mounted to the vehicle body.

FIG. 2A is a view showing a conventional battery pack. In FIG. 2A, the triangle symbol indicates the mounting portion of the battery pack that is mounted to the vehicle body. The cross-sectional view taken along the line indicated by the arrows in FIG. 2A is shown in FIG. 3A. The second mounting structure 240 may be a part that protrudes in a direction parallel to the direction in which the cells are stacked, and thus stress may be concentrated on the second mounting structure 240. In the conventional battery pack, in which the battery modules are cased only with the end plates, only four second mounting structures 240, which are indicated by the triangle symbols, may function as the mounting portions. Accordingly, the conventional battery pack including the large-area battery module assembly may be vulnerable to impacts and vibrations.

FIGS. 2B and 2C are views showing the battery pack according to an embodiment of the present invention. In FIGS. 2B and 2C, the triangle symbol indicates the mounting portion of the battery pack that is mounted to the vehicle body. The cross-sectional view taken along the line indicated by the arrows in FIG. 2B is shown in FIGS. 2C and 3B. Unlike what is illustrated in FIG. 2A, the second mounting structure 240 may protrude in a direction perpendicular to the direction in which the cells are stacked. In addition, a separate mounting structure may be formed in a direction parallel to the direction in which the cells are stacked.

FIG. 2B is a view showing the battery pack according to an embodiment of the present invention. The auxiliary rigid plate 260 may further include a first mounting structure 220, which is coupled to the housing and protrudes in a direction perpendicular to the direction in which the cells are stacked so as to be mounted in the space between the battery modules. Due to the first mounting structure 220 coupled to the auxiliary rigid plate 260, the number of mounting portions becomes greater than that of the conventional battery pack, thereby effectively dispersing vibrations and impacts.

As shown in FIG. 2B, the first mounting structure 220 may include a mounting recess, which is formed in a shape suitable for a portion to which the battery pack is mounted, and a mounting protrusion, which enables the auxiliary rigid plate 260 and a cover (not shown) covering the front and rear surfaces of the battery modules to be coupled in an insertion-coupling manner.

As shown in FIG. 2C, the auxiliary rigid plate 260 may have an opening formed therein to allow the long bolt 182 to be fastened into the housing. In addition, a pad 124 may be disposed between every two adjacent battery cells 122 included in the battery modules 120.

FIG. 3A is a cross-sectional view of a conventional battery pack, and FIG. 3B is a cross-sectional view of a battery pack according to an embodiment of the present invention. As shown in FIG. 3A, in the conventional battery pack, even when the number of battery modules is halved, the number of mounting portions, i.e. the number of second mounting structures 240, is still four (2×2 (symmetric)). In contrast, as shown in FIG. 3B, the battery pack according to an embodiment of the present invention has two more mounting portions than the conventional battery pack due to the auxiliary rigid plate 260 and the first mounting structures 220 included in the auxiliary rigid plate. In particular, when the number of battery modules is halved and thus the weight of the battery modules is doubled, it is possible to effectively disperse impacts and vibrations.

FIG. 4 is a view showing a structure in which a separate fastening member is connected to the auxiliary rigid plate of a battery pack according to an embodiment of the present invention. The first mounting structure 220 may have a first nut portion 262 so as to be bolted to the auxiliary rigid plate 260. In addition, the auxiliary rigid plate 260 may have a third nut portion 268, which is coupled to the top clamp 142 by means of the bolt 182, and a fourth nut portion (not shown), which is coupled to the bottom clamp 162 by means of the bolt. Accordingly, according to this embodiment of the present invention, the first mounting structure is tightly integrated with the auxiliary rigid plate 260 and the top clamp and the bottom clamp of the housing.

FIGS. 5A to 5C are views showing the structure in which the auxiliary rigid plate and the top and bottom clamps are coupled to each other in the battery pack according to an embodiment of the present invention. The auxiliary rigid plate 260 may have a third nut portion 264, which is coupled to the top clamp 142 using a bolt, and a fourth nut portion 266, which is coupled to the bottom clamp 162 using a bolt. As shown in FIG. 5A, the auxiliary rigid plate 260 is coupled to the end plate 180 using the long bolt 182. The top cover 140 is held and clamped by the top clamp 142. FIG. 5B is an enlarged view of portion a in FIG. 5A, and FIG. 5C is an enlarged view of portion b in FIG. 5A. As shown in FIGS. 5B and 5C, the auxiliary rigid plate 260 and the top clamp 142 are spaced apart from each other so that the top clamp 142 is bolted to the third nut portion 264. In the battery modules, each battery cell 122 may be coupled to the pad 124. Similarly, the auxiliary rigid plate 260 and the bottom clamp 162 are spaced apart from each other so that the bottom clamp 162 is bolted to the fourth nut portion 266. In the battery modules, each battery cell 122 may be coupled to the pad 124.

In addition, embodiments of the present invention relate to a vehicle including the battery pack according to embodiments of the present invention. The embodiments of the present invention may be applied to an electric vehicle (EV), in which a high-voltage battery pack for driving a motor is mounted to a lower portion of the vehicle body. In this case, the EV, in which vibrations continuously occur due to operation of the motor and impacts are intermittently transferred thereto due to contact between the vehicle body and obstacles, is capable of absorbing and dispersing collision energy in the event of a side collision, thereby preventing damage to the battery cells.

The battery module of the battery pack according to embodiments of the present invention has been described as being of a pouch type, in which a plurality of battery cells is modularized by being stacked and connected in series or in parallel. However, the battery pack disclosed herein may be appropriately implemented by those skilled in the art even when the battery module is of a cylinder type or a prismatic type.

As is apparent from the above description, embodiments of the present invention are capable of solving a problem associated with a battery pack in which a battery module including a plurality of battery cells is cased only with an end plate coupled thereto by employing an auxiliary rigid plate to disperse weight, thereby improving the structural stability of the battery module and effectively storing high energy in the battery module.

However, the effects achievable through embodiments of the invention are not limited to the above-mentioned effects, and other effects not mentioned herein will be clearly understood by those skilled in the art from the above description.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery pack comprising:
   a plurality of battery modules, each battery module comprising a plurality of battery cells stacked and connected in parallel, the battery modules being arranged adjacent to each other;
   a fixedly surrounding the battery modules, wherein the housing comprises a top cover comprising a top clamp configured to cover upper surfaces of the battery modules to hold the battery modules and wherein the housing further comprises a bottom clamp configured to cover lower surfaces of the battery modules to hold the battery modules; and
   an auxiliary plate disposed between the battery modules so as to face side surfaces of the battery modules, the auxiliary plate being coupled to the housing and defining a unitary body together with the housing, wherein the auxiliary plate comprises a first mounting structure coupled to the housing and protruding in a direction perpendicular to a direction in which the plurality of battery cells is stacked and wherein the auxiliary plate is mounted in a space between the battery modules.

2. The battery pack according to claim 1, wherein the first mounting structure comprises a first nut portion configured to be bolted to the auxiliary plate.

3. The battery pack according to claim 1, wherein:

the housing further comprises an end plate disposed on the side surface of each of the battery modules perpendicular to a direction in which the battery modules are connected to each other; and the end plate comprises a second nut portion configured to be bolted to the auxiliary plate.

4. The battery pack according to claim 3, wherein the end plate further comprises a second mounting structure protruding from a side surface of the end plate in a direction parallel to the direction in which the plurality of battery cells is stacked.

5. The battery pack according to claim 3, wherein the auxiliary plate comprises a third nut portion configured to be bolted to the top clamp and a fourth nut portion configured to be bolted to the bottom clamp.

6. The battery pack according to claim 3, further comprising a plurality of the end plates, wherein the plurality of the end plates comprises:

a right end plate disposed on a right surface of a right one of the battery modules; and a left end plate disposed on a left surface of a left one of the battery modules, the left end plate being engaged with the right end plate to define a unitary body.

7. The battery pack according to claim 6, further comprising a tray spaced apart from the housing while covering the housing, the tray defining a space in which to seat the battery modules, wherein the battery modules are mounted on the tray by a first mounting member configured to connect the tray to the auxiliary plate and to protrude so as to be mounted in the space between the battery modules.

8. The battery pack according to claim 7, further comprising:

a sensor mounted on an inner surface of the tray, the sensor being configured to sense a contact; and a protection circuit configured to control charging discharging of the plurality of battery cells based on a result of sensing of the contact.

9. The battery pack according to claim 1, further comprising a pad disposed between adjacent ones of the plurality of battery cells.

10. A battery pack comprising:

a plurality of battery modules, each battery module comprising a plurality of battery cells stacked and connected in parallel and having a first fixedly surrounding the plurality of battery cells, the battery modules being arranged adjacent to each other;

a second fixedly surrounding the battery modules, wherein the second housing comprises a top cover comprising a top clamp configured to cover upper surfaces of the battery modules to hold the battery modules and wherein the second housing further comprises a bottom clamp configured to cover lower surfaces of the battery modules to hold the battery modules; and an auxiliary plate disposed between the battery modules so as to face side surfaces of the battery modules, the auxiliary plate being coupled to the second housing and defining a unitary body together with the second housing, wherein the auxiliary plate comprises a first mounting structure coupled to the second housing and protruding in a direction perpendicular to a direction in which the plurality of battery cells is stacked and wherein the auxiliary plate is mounted in a space between the battery modules.

11. The battery pack according to claim 10, wherein the first mounting structure comprises a first nut portion configured to be bolted to the auxiliary plate.

12. A vehicle comprising:

a vehicle body; and a battery pack mounted to a lower portion of the vehicle body, the battery pack comprising:

a plurality of battery modules, each battery module comprising a plurality of battery cells stacked and connected in parallel, the battery modules being arranged adjacent to each other;

a fixedly surrounding the battery modules, wherein the housing comprises a top cover comprising a top clamp configured to cover upper surfaces of the battery modules to hold the battery modules and wherein the housing further comprises a bottom clamp configured to cover lower surfaces of the battery modules to hold the battery modules; and an auxiliary plate disposed between the battery modules so as to face side surfaces of the battery modules, the auxiliary plate being coupled to the housing and defining a unitary body together with the housing, wherein the auxiliary plate comprises a first mounting structure coupled to the housing and protruding in a direction perpendicular to a direction in which the plurality of battery cells is stacked, wherein the auxiliary plate is mounted in a space between the battery modules.

13. The vehicle according to 12, wherein the auxiliary plate comprises a third nut portion bolted to the top clamp and a fourth nut portion bolted to the bottom clamp.

14. The vehicle according to claim 12, further comprising:

a tray spaced apart from the housing while covering the housing, the tray defining a space in which to seat the battery modules, wherein the battery modules are mounted on the tray by a first mounting member connecting the tray to the auxiliary plate and protruding so as to be mounted in the space between the battery modules;

a sensor mounted on an inner surface of the tray, the sensor being configured to sense a contact; and a protection circuit configured to control charging and discharging of the plurality of battery cells based on a result of sensing of the contact.

15. The vehicle according to claim 12, further comprising a pad disposed between adjacent ones of the plurality of battery cells.

16. The vehicle according to claim 12, further comprising a tray spaced apart from the housing, wherein the battery modules are mounted on the tray.

17. The vehicle according to claim 16, wherein the battery modules are mounted on the tray by a first mounting member connecting the tray to the auxiliary plate.

18. The vehicle according to claim 16, further comprising a sensor mounted on an inner surface of the tray.

19. The vehicle according to claim 18, further comprising a protection circuit coupled to the sensor and configured to control charging and discharging of the plurality of battery cells based on an output of the sensor.

20. The vehicle according to claim 12, wherein the housing further comprises an end plate disposed on a side surface of each of the battery modules perpendicular to a direction in which the battery modules are connected to each other.

\* \* \* \* \*